United States Patent
Hayakawa

(10) Patent No.: US 9,511,726 B2
(45) Date of Patent: Dec. 6, 2016

(54) COMPOSITE CABLE FOR A VEHICLE

(71) Applicant: Hitachi Metals, Ltd., Tokyo (JP)

(72) Inventor: Yoshikazu Hayakawa, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 14/940,705

(22) Filed: Nov. 13, 2015

(65) Prior Publication Data

US 2016/0068119 A1 Mar. 10, 2016

Related U.S. Application Data

(63) Continuation of application No. 14/142,185, filed on Dec. 27, 2013.

(30) Foreign Application Priority Data

Jan. 8, 2013 (JP) ................................. 2013-001348

(51) Int. Cl.
*B60R 16/02* (2006.01)

(52) U.S. Cl.
CPC ....... *B60R 16/0215* (2013.01); *B60R 16/0207* (2013.01)

(58) Field of Classification Search
USPC .................................................. 174/34, 47
See application file for complete search history.

(56) References Cited

U.S. PATENT DOCUMENTS

| | | | | |
|---|---|---|---|---|
| 2,041,093 A | * | 5/1936 | Schweitzer | H01B 7/28 174/121 R |
| 2,532,135 A | * | 11/1950 | Whyland | H01B 3/30 174/113 R |
| 3,013,109 A | | 12/1961 | Gorman et al. | |
| 3,079,460 A | * | 2/1963 | Grove | H01B 5/08 174/128.1 |
| 3,540,203 A | | 11/1970 | Thoresen et al. | |
| 3,607,490 A | | 9/1971 | Heinzmann et al. | |
| 3,710,009 A | * | 1/1973 | Hoeg | H01B 3/30 174/110 AR |

(Continued)

FOREIGN PATENT DOCUMENTS

| | | |
|---|---|---|
| JP | 04-253110 A | 9/1992 |
| JP | 2005-251608 A | 9/2005 |

(Continued)

OTHER PUBLICATIONS

Office Action JP 2013-001348 and English translation of Notification of Reasons for Refusal dated Apr. 21, 2015.

(Continued)

*Primary Examiner* — William H Mayo, III
*Assistant Examiner* — Krystal Robinson
(74) *Attorney, Agent, or Firm* — Roberts Mlotkowski Safran Cole & Calderon, PC

(57) ABSTRACT

A composite cable for a vehicle is configured to connect between a wheel-side device which is fixed on a wheel side via a suspension device with respect to a body of the vehicle and a body-side device disposed on a body side. The composite cable includes wires, each of which includes a center conductor and an insulation for coating the center conductor. The center conductor includes a stranded wire comprising a plurality of solid conductors stranded with each other, and a diameter of each solid conductor is 0.05 mm to 0.12 mm. The composite cable also includes a sheath collectively covering the wires; and a lubricating member interposed between the wires and the sheath for reducing a frictional resistance between the wires and the sheath.

20 Claims, 6 Drawing Sheets

(56) References Cited

U.S. PATENT DOCUMENTS

| | | | |
|---|---|---|---|
| 3,758,704 A | 9/1973 | Naud | |
| 3,979,896 A * | 9/1976 | Klett | D07B 1/144 57/215 |
| 4,743,712 A * | 5/1988 | Lee | H01B 11/12 174/113 C |
| 4,777,324 A * | 10/1988 | Lee | H01B 7/0009 174/113 R |
| 4,937,401 A * | 6/1990 | Lee | H01B 7/0009 174/113 C |
| 5,767,441 A * | 6/1998 | Brorein | H01B 11/002 174/27 |
| 6,242,097 B1 | 6/2001 | Nishiguchi et al. | |
| 7,516,823 B2 | 4/2009 | Kikuchi et al. | |
| 2008/0236964 A1 | 10/2008 | Kikuchi et al. | |
| 2009/0114417 A1 | 5/2009 | Nakayama et al. | |
| 2010/0051316 A1 | 3/2010 | Sorimachi et al. | |
| 2011/0005805 A1 | 1/2011 | Eshima | |

FOREIGN PATENT DOCUMENTS

| | | |
|---|---|---|
| JP | 2008-238987 A | 10/2008 |
| JP | 2012-124005 A | 6/2012 |

OTHER PUBLICATIONS

Japanese Office Action No. 2013-0013848 dated Sep. 1, 2015 and English translation of the Notification of Reasons for Refusal.

* cited by examiner

COMPOSITE CABLE FOR A VEHICLE

The present application is a continuation of U.S. application Ser. No. 14/142,185 filed on Dec. 27, 2013, which claims priority of Japanese Patent Application No. 2013-001348 filed on Jan. 8, 2013, the entire contents of which are incorporated herein by reference.

BACKGROUND OF THE INVENTION

1. Field of the Invention

The present invention relates to a composite cable for a vehicle to be used for connecting between a wheel-side device which is fixed on a wheel side via a suspension device with respect to a body of the vehicle and a body-side device disposed on a body side.

2. Description of the Related Art

Conventionally, as a cable for connecting between the wheel-side device which is fixed on the wheel side and the body-side device disposed on the body side, a cable including a plurality of wires and a sheath collectively accommodating the plurality of wires has been known (e.g. JP-A 2008-238987).

The cable (harness) disclosed by JP-A 2008-238987 is connected to the electric brake device provided on the wheel-side at one end, and connected to a battery mounted on the body-side at the other end. The electric brake device receives a power (electric current) from the battery via a cable, drives the motor by the supplied power, and exerts a braking force by pressing a brake pad(s) to a brake disc.

SUMMARY OF THE INVENTION

The cable for a vehicle having the aforementioned configuration is required to be bent to follow the movement of the wheels in accordance with the travelling of the vehicle and to have high bending durability to withstand long-term use. Since JP-A 2008-238987 is silent to the improvement in bending durability, there is still a room for improvement.

Accordingly, an object to the present invention is to provide a composite cable for a vehicle with improved bending durability.

According to a feature of the invention, a composite cable for a vehicle, configured to connect between a wheel-side device which is fixed on a wheel side via a suspension device with respect to a body of the vehicle and a body-side device disposed on a body side, the composite cable comprises:

wires, each of which comprises a center conductor and an insulation for coating the center conductor, the center conductor comprising a stranded wire comprising a plurality of solid conductors stranded with each other, a diameter of each solid conductor being 0.05 mm to 0.12 mm;

a sheath collectively covering the wires; and a lubricating member interposed between the wires and the sheath for reducing a frictional resistance between the wires and the sheath.

Effect of the Invention

According to the composite cable for a vehicle in the present invention, it is possible to improve the bending durability.

BRIEF DESCRIPTION OF THE DRAWINGS

Next, the present invention will be explained in more detail in conjunction with appended drawings, wherein:

FIGS. 3A to 3C are diagrams showing a composite cable, wherein FIG. 3A is a perspective view of the composite cable from which a part of a sheath is removed, FIG. 3B is an enlarged view of an end portion of a first wire, and FIG. 3C is an enlarged view of an end portion of a second wire;

DETAILED DESCRIPTION OF THE EMBODIMENTS

The First Embodiment

Figure 1:
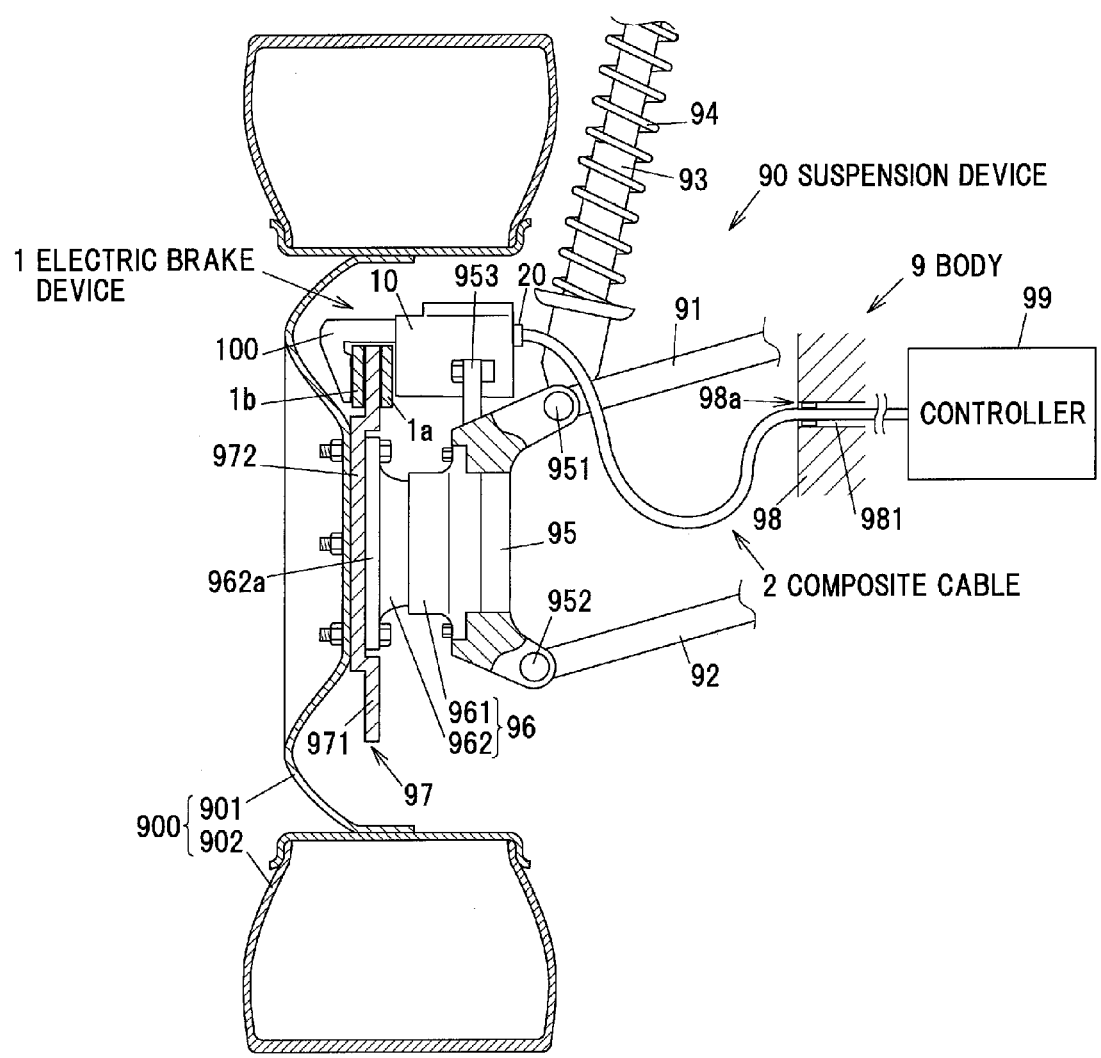
FIG. 1 is a schematic diagram showing an electric brake device on which a composite cable for a vehicle is mounted and a peripheral portion thereof in a first embodiment according to the present invention.

FIG. 1 is a schematic diagram showing an electric brake device on which a composite cable for a vehicle is mounted and a peripheral portion thereof in a first embodiment according to the present invention.

An electric brake device 1 as the wheel-side device is fixed on the side of a wheel 900 via a suspension device 90 with respect to a body 9. The suspension device 90 is configured to include an upper arm 91, a lower arm 92, a shock absorber 93, and a suspension spring 94. The upper arm 91 and the lower arm 92 are connected via a bearing to a knuckle 95 as a wheel support member. The upper arm 91 is connected together with the shock absorber 93 to a first mounting portion 951 of the knuckle 95. The lower arm 92 is connected to a second mounting portion 952 of the knuckle 95. The suspension spring 94 is coaxially disposed on an outer periphery of the shock absorber 93.

A hub outer ring 961 of a hub unit 96 is fixed to the knuckle 95. A hub 962 having a wheel mounting flange 962a is disposed inside the hub outer ring 961. A plurality of rolling elements (not shown) are held by a holding device and disposed between an inner periphery surface of the hub outer ring 961 and an outer periphery surface of the hub 962, such that the hub 962 is rotatable relative to the hub outer ring 961.

The brake rotor 97 having a disc shape is fixed together with a wheel main body 901 of the wheel 900. The brake rotor 97 comprises a friction portion 971 which slides with friction along brake pads 1a, 1b to be described later, and a fixed portion 972 which is fixed to the wheel mounting flange 962a of the hub 962 as one piece. The friction portion 971 is provided on the side of an outer periphery of the fixed portion 972. A tire 902 is mounted on the wheel main body 901.

A third mounting portion 953 is provided at the knuckle 95 to protrude from the knuckle 95, and the electric brake device 1 is fixed to the third mounting portion 953. The electric brake device 1 comprises a main body portion 10 and a caliper 100, and presses a pair of the brake pads 1a, 1b against the friction portion 971 of the brake rotor 97, thereby generates a frictional force as a braking force of the vehicle during running. The electric brake device 1 comprises a parking brake mechanism for maintaining the frictional force between the friction portion 971 of the brake rotor 97 and the pair of brake pads 1a, 1b during parking. The electric brake device 1 is connected to one end of the composite cable 2 for supplying an electric current for operating the parking brake.

According to the above configuration, the wheel 900 swings with respect to the body 9, when the tire 902 is pushed up from the road surface or the body 9 is tilted by turning, acceleration or deceleration. The electric brake device 1 is swung together with the wheel 900, and the composite cable 2 is bent by the swing of this electric brake device 1.

(Configuration of the Electric Brake Device 1)

Figure 2:
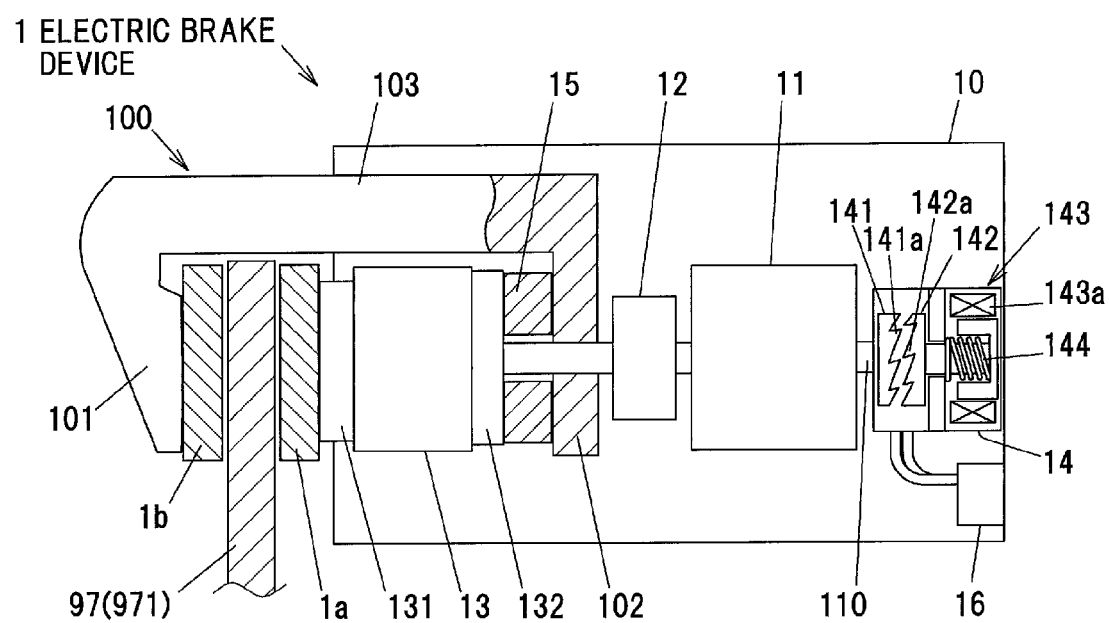
FIG. 2 is a schematic diagram showing an example of the configuration of the electric brake device.

FIG. 2 is a schematic diagram showing an example of the configuration of the electric brake device 1. The electric brake device 1 comprises a main body portion 10 including an electric motor 11, a decelerating mechanism 12 for decelerating the output of the electric motor 11, a thrust generating mechanism 13 for generating a thrust to press the brake pads 1a, 1b against the friction portion 971 of the rotor 97 by converting torque of the electric motor 11 decelerated by the decelerating mechanism 12 into linear motion, and a parking brake mechanism 14.

The electric motor 11 is e.g. a DC motor, and motor current is supplied through a wire (not shown). For example, the decelerating mechanism 12 is e.g. a planetary gear type decelerating mechanism. Thrust generating mechanism 13 is e.g. a ball ramp mechanism, which generates a thrust in the axial direction by rolling a ball in a ball groove inclined with respect to the circumferential direction and separating first and second output members 131, 132 from each other. The first output member 131 is arranged to face the brake pad 1a located at an inner side (i.e. body 9-side), and the second output member 132 is arranged on the opposite side.

The caliper 100 comprises a claw portion 101 which faces the brake pad 1b at an outer side (i.e. wheel 901-side), a flange portion 102 provided to sandwich the thrust generating mechanism 13 between the pawl portion 101 and the flange portion 102, and an arm portion 103 for coupling the claw portion 101 and the flange portion 102 as one piece. An axial force sensor 15 for measuring the thrust of the thrust generating mechanism 13 is disposed between the flange portion 102 and the second output member 132 of the thrust generating mechanism 13. The axial force sensor 15 outputs an electrical signal having an intensity corresponding to the thrust of the thrust generating mechanism 13.

The parking brake mechanism 14 comprises a first engaging member 141 coupled to a shaft 110 of the electric motor 11, a second engaging member 142 disposed to be axially movable relative to the first engaging member 114 and non-rotatably relative to the main body portion 10, a solenoid mechanism 143 for axially moving the second engaging member 142 toward the first engaging member 141, and a coil spring 144 for energizing the second engaging member 142 in a direction to be distant from the first engaging member 141.

The first engaging member 141 is provided with a plurality of engaging protrusions 141a along the circumferential direction. Each of the engaging protrusions 141a has a triangular shape in which an apex angle is an acute angle when viewed from the radial direction and two slopes approaching each other toward the apex from the base are inclined in the same direction in the circumferential direction. The second engaging member 142 is provided with a plurality of engaging protrusions 142a for engaging with the plurality of engaging protrusions 141a of the first engaging member 141. Similarly to the plurality of engaging protrusions 141a of the first engaging member 141, each of the engaging protrusions 142a has a triangular shape in which an apex angle is an acute angle when viewed from the radial direction and two slopes approaching each other toward the apex from the base are inclined in the same direction in the circumferential direction.

The inclination direction of the slopes of the plurality of engaging protrusions 141a of the first engaging member 141 and the inclination direction of the slopes of the plurality of engaging protrusions 142a of the second engaging member 142 and are opposite to each other. Thus, if the plurality of engaging protrusions 141a of the first engaging member 141a and the plurality of engaging protrusions 142a of the second engaging member 142 are once engaged with each other, the engagement thereof will not be released unless the shaft 110 of the electric motor 11 is rotated in a direction to release the engagement between the engaging protrusions 141a and 142a.

The solenoid mechanism 143 comprises an annular electromagnetic coil 143a. By energizing the electromagnetic coil 143a, the second engaging member 142 is moved toward the first engaging member 141, so that the plurality of engaging protrusions 141a of the first engaging member 141 and the plurality of engaging protrusions 142a of the second engaging member 142 are engaged with each other. The electric current is supplied to the electromagnetic coil 143a through the first and second wires 3, 4 (to be described later) of the composite cable 2 from the controller 99 (shown in FIG. 1) which is provided in the body 9. In the composite cable 2, one end portion derived from a routing path 981 having an outlet port 98a (shown in FIG. 1) of the wheel housing 98 is connected to the electric brake device 1, and the other end portion is connected to the controller 99. A connector 20 is provided at the one end portion of the composite cable 2, and the connector 20 is fitted into a device-side connector 16 of the electric brake device 1. The controller 99 is an example of a body-side device which is disposed on the body 9-side.

In the electric brake device 1 configured as described above, when applying the electric current to the electromagnetic coil 143a in a state where the brake pads 1a, 1b are pressed against the friction portion 971 of the brake rotor 97 by the torque of the electric motor 11, the first engaging member 141 and the second engaging member 142 are engaged with each other. The engagement of the first engaging member 141 with the second engaging member 142 can be released by supplying the motor current to the electric motor 11 in a state of interrupting the energization of the electromagnetic coil 143a, and rotating the shaft 110 in a direction such that the brake pads 1a, 1b are pressed against the brake rotor 97. After the engagement of the first engaging member 141 with the second engaging member 142 is released, the second engaging member 142 is separated away from the first engaging member 141 by the restoring force of the coil spring 144.

(Configuration of a Composite Cable 2)

Figure 3:
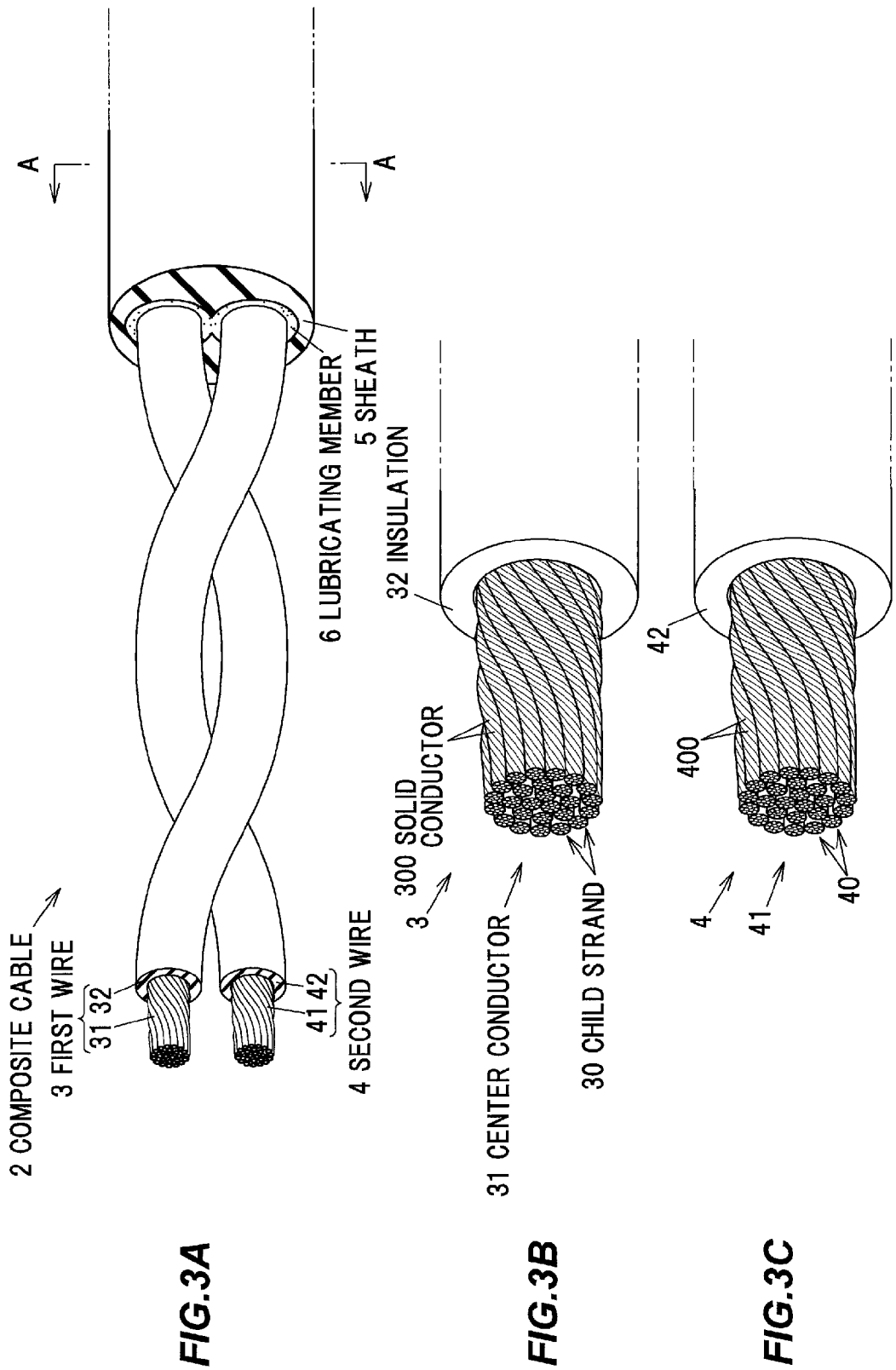
Figure 4:
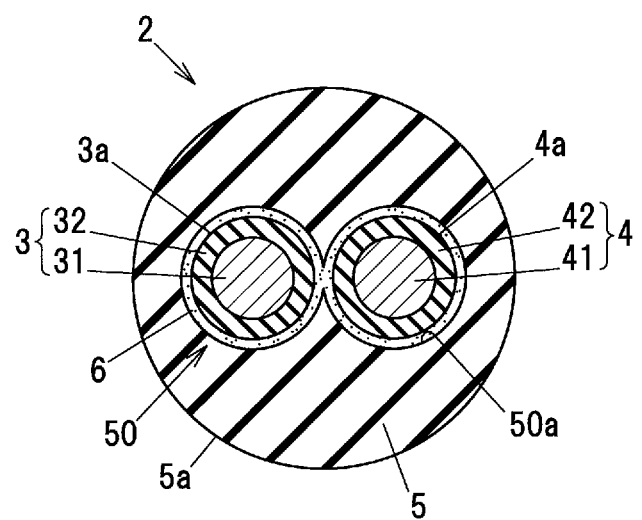
FIG. 4 is a cross-sectional view taken along A-A line in FIG. 3A.

FIGS. 3A to 3C show a composite cable 2, wherein FIG. 3A is a perspective view of the composite cable 2 from which a part of a sheath 5 is removed, FIG. 3B is an enlarged view of an end portion of a first wire 3, and FIG. 3C is an enlarged view of an end portion of a second wire 4. FIG. 4 is a cross-sectional view taken along A-A line in FIG. 3A.

The composite cable 2 comprises a first wire 3, a second wire 4 (hereinafter also referred to as "first and second wires 3, 4"), a sheath 5 collectively covering the first and second wires 3, 4, and a lubricating member 6 interposed between the first and second wires 3, 4 and the sheath 5. In the present embodiment, as shown in FIG. 3A, the lubricating member 6 is also interposed between the first wire 3 and the second wire 4.

The first wire 3 is an insulated wire which comprises a center conductor 31 and an insulation 32 for coating the center conductor 31 as an electrically insulation coating. The second wire 4 is an insulated wire which comprises a center conductor 41 and an insulation 42 for coating the center conductor 41 as an electrically insulation coating. The first wire 3 and the second wire 4 are twisted to each other inside the sheath 5.

For example, the sheath 5 comprises a flexible resin such as polyurethane. As shown in FIG. 4, an inner space 50 for accommodating the first and second wires 3, 4 is formed within the sheath 5. An outer periphery surface 5a of the sheath 5 is circular in a cross section perpendicular to a longitudinal direction of the composite cable 2. As to the hardness of the sheath 5, JISA hardness is preferably in a range from 80 degrees to 95 degrees. In this embodiment, JISA hardness of the sheath 5 is 90 degrees.

The lubricating member 6 is provided for increasing the lubricity of the first and second wires 3, 4 in the inner space 50 of the sheath 5. The lubricating member 6 is interposed between an inner surface 50a of the inner space 50 of the sheath 5 and the outer periphery surfaces 3a, 4a of the first and second wires 3, 4, and the lubricating member 6 reduces the frictional resistance between the first and second wires 3, 4 and the sheath 5. In the present embodiment, the lubricating member 6 is consisted essentially of powder having a particle size of 5 μm to 50 μm. As the material of this powder, talc ($Mg_3Si_4O_{10}(OH)_2$), silica ($SiO_2$), or the like may be preferably used. Here, the particle size refers to the size of particles obtained by sieve analysis defined by JIS8801, microscopy method, laser diffraction scattering method, electrical detection method, chromatography method, or the like.

As shown in FIG. 3B, the center conductor 31 of the first wire 3 is a stranded wire formed by stranding a plurality of solid conductors (elemental wires) 300. Specifically, the center conductor 31 is a double stranded wire (i.e. a rope-lay stranded wire) which is formed by combining and stranding a plurality of child strands 30, each of which is made by stranding the plurality of solid conductors 300. The solid conductor 300 is consisted essentially of a highly electrically conductive metal such as copper, copper alloy, and a diameter of the solid conductor is 0.05 mm to 0.12 mm, more preferably, 0.07 mm to 0.09 mm. When the diameter of solid conductor is less than 0.05 mm, the strength of the solid conductor itself will be lowered, so that the solid conductor may be broken easily when the composite cable 2 is repeatedly bent or swung. On the other hand, when the diameter of the solid conductor is more than 0.12 mm, the flexibility of composite cable 2 will be lowered, so that the solid conductor may be broken easily when the composite cable 2 is repeatedly bent or swung similarly.

The child strand 30 may be formed by stranding e.g. 50 to 100 (pieces) of solid conductors 300. The center conductor 31 may be formed by stranding e.g. 7 to 19 (pieces) of child strands 30.

The second wire 4 has the same structure as the first wire 3. As shown in FIG. 3C, the center conductor 41 of the second wire 4 is a double stranded wire (i.e. a rope-lay stranded wire) which is formed by combining and stranding a plurality of child strands 40, each of which is made by stranding the plurality of solid conductors 400. The diameter and the material of the solid conductor 400 are the same as those of the solid conductor 300 of the first wire 3. In addition, the number of the solid conductors 400 stranded as the child strand 40 and the number of the child strands 40 stranded as the center conductor 41 are also the same as those of the first wire 3.

The stranding directions of the conductors 300, 400 in the child strands 30, 40 are the same as the stranding direction of the child strands 30, 40 in the center conductors 31, 41. For example, in FIGS. 3A to 3C, as viewed from a center side (the right side in FIG. 3A) toward an end portion side (the left side in FIG. 3A) in the longitudinal direction of the composite cable 2, the plurality of solid conductors 300, 400 are stranded in a counterclockwise direction to configure the child strands 30, 40, respectively, and the plurality of child strands 30, 40 are stranded in the counterclockwise direction to configure the center conductors 30, 40, respectively.

The twisting directions of the first and second wires 3, 4 are opposite to the stranding directions of the solid conductors 300, 400 in the child strands 30, 40 and the stranding directions of the child strands 30, 40 in the center conductors 31, 41. That is, when viewed from the center side toward the end portion side in the longitudinal direction of the composite cable 2, the first and second wires 3, 4 are twisted in the clockwise direction.

(Operation and Effect of the Embodiment)

According to the embodiment described above, it is possible to obtain the effects and advantages described below.

(1) The center conductors 31, 41 of the first and second wires 3, 4 are stranded wires formed by stranding the plurality of solid conductors 300, 400, each having the diameter of 0.05 mm to 0.12 mm, respectively and the lubricating member 6 is interposed between the first and second wires 3, 4 and the sheath 5. According to this configuration, the flexibility of the composite cable 2 is enhanced while the strength of the conductors 300, 400 are maintained, and the frictional resistance between the first and second wires 3, 4 and the sheath 5 is reduced, so that it is possible to reduce the force applied to the first and second wires 3, 4 by the inner surface 50a, thereby to improve the bending durability. Thus, for example, when the controller 99 disposed on the side of the body 9 and the electric brake device 1 which is fixed on the side of the wheel 900 via the suspension device 90 are connected to each other by the composite cable 2, it is possible to suppress the increase in electrical resistance and occurrence of breakage in the composite cable 2 over a long time.

(2) The center conductors 31, 41 of the first and second wires 3, 4 are stranded wires formed by combining and stranding the child strands 30, 40, each of which is formed by stranding the plurality of solid conductors 300, 400, respectively, and the center conductors 31, 41 are stranded in the same direction as the stranding direction of the solid conductors 300, 400 in the child strands 30, 40. According to this configuration, as compared with a composite cable in which the center conductors 31, 41 are stranded in the opposite direction to the stranding direction of the solid conductors 300, 400 in the child strands 30, 40, it is possible to further improve the bending durability of the composite cable 2. In other words, by configuring the stranding direction of the solid conductors 300, 400 in the child strands 30, 40 to be the same direction as the stranding direction of the child strands 30, 40 in the center conductors 31, 41, for example, as shown in FIGS. 3B and 3C, the direction of extension of the solid conductors 300, 400 are greatly inclined with respect to an axial direction (the longitudinal direction) of the composite cable 2. Accordingly, when the composite cable 2 is bent, the child strands 30, 40 will flexibly stretch and contract, by loosening and tightening the strands of the solid conductors 300, 400, so that the center conductors 31, 41 will flexibly stretch and contract. As a result, the bending durability of the composite cable 2 is further improved.

(3) The lubricating member 6 interposed between the first and second wires 3, 4 and the sheath 5 comprises the powder with a particle size of 5 μm to 50 μm. According to this configuration, when the composite cable 2 is bent, the force applied to the first and second wires 3, 4 by the inner surface 50a of the inner space 50 will be sufficiently reduced, so that the bending durability of the composite cable 2 will be further improved.

(4) The first wire 3 and the second wire 4 are twisted together. According to this configuration, when the composite cable 2 is bent, it is possible to shorten a length (distance) of a section in which either one of the first and second wires 3, 4 is located outside the curve while the other one of the first and second wires 3, 4 is located inside the curve, so that it is possible to further improve the bending durability of the composite cable 2. In other words, assuming that the first wire 3 and the second wire 4 are not twisted together and the first wire 3 and the second wire 4 are disposed in parallel to each other along the axial direction (longitudinal direction) of the composite cable 2, when the composite cable 2 is bent, either one of the first and second wires 3, 4 may be located outside the curve while the other one of the first and second wires 3, 4 may be located inside the curve over an entire length of the curve. In this case, the first wire 3 receives a force in the direction in which the first wire 3 is stretched in the longitudinal direction, and the second wire 3 receives a force in the direction in which it is compressed in the longitudinal direction of the second wire 4. Thus, the breakage is likely to occur in the solid conductors 300, 400. According to the present embodiment, the first and second wires 3, 4 are twisted together, so that it is possible to shorten the length (distance) of the section in which the first and second wires 3, 4 are located outside or inside the curve, thereby suppress the breakage of the solid conductors 300, 400.

(5) The twisting directions of the first and second wires 3, 4 are opposite to the stranding directions of the solid conductors 300, 400 in the child strands 30, 40 and the stranding directions of the child strands 30, 40 in the center conductors 31, 41. According to this configuration, it is possible to suppress the curvature of the composite cable 2 in a natural state that the composite cable 2 is not fixed to the vehicle or the like, thereby to improve the routing workability of the composite cable 2. In other words, if the twisting directions of the first and second wires 3, 4 are the same as the stranding directions of the solid conductors 300, 400 in the child strands 30, 40 and the stranding directions of the child strands 30, 40 in the center conductors 31, 41, the composite cable 2 will be curved in the natural state, the routing work of the composite cable 2 in the routing path 981 (as shown in FIG. 1) may become difficult. In the present embodiment, since the twisting directions of the first and second wires 3, 4 are opposite to the stranding directions of the solid conductors 300, 400 in the child strands 30, 40 and the stranding directions of the child strands 30, 40 in the center conductors 31, 41, it is possible to suppress the curvature of the composite cable 2, thereby improve the routing workability.

(6) The lubricating member 6 is also interposed between the first wire 3 and the second wire 4. According to this configuration, it is possible that it is possible to reduce the frictional resistance between the first wire 3 and the second wire 4, thereby further improve the bending durability of the composite cable 2.

(7) The sheath 5 has the JISA hardness of 80 degrees to 95 degrees. According to this configuration, it is possible to reduce the collapse of the inner space 50 of the sheath 5 when the composite cable 2 is bent, so that it is possible to further reduce the frictional resistance between the first and second wires 3, 4 and the sheath 5. Accordingly, it is possible to improve the bending durability of the composite cable 2.

EXAMPLES

Next, the experimental results of the 90° bending test and swinging endurance test of the composite cable 2 according to an embodiment of the present invention will be explained. It should be noted that the present invention is not limited to the present embodiment.

Various elements and factors of the composite cable 2 according to the present embodiment are as shown below Material of the solid conductors 300, 400: copper alloy containing tin Diameter of the solid conductors 300, 400: 0.08 mm Material of the insulations 32, 42: crosslinked polyethylene Outer diameter of the first and second wires 3, 4: 3.0 mm Material of the sheath 5: thermoplastic polyurethane Outer diameter of the sheath 5: 8.0 mm Material of the lubricating member 6: powder talc (average particle size of 11 μm)

Hardness of the sheath 5: JISA 90

(90° bending test)

The 90° bending test was carried out by using the composite cable 2 of the above specification. In the 90° bending test, a curvature radius was 10 mm and a flexion bending speed was 30 times/min. While pulling the composite cable 2 with a load of 2 kgf, the composite cable 2 was bent by 90° in opposite directions across the fulcrum. As to the number of times of bending, a single cycle of bending was defined as an operation of 90° bending from a neutral position (the position where the composite cable 2 is in a straight state) toward one direction and 90° bending toward the opposite direction through the neutral position until the composite cable 2 is restored to the neutral position. Then, the number of times of bending until the breakage of the composite cable 2 occurs (until the composite cable 2 is broken) at a room temperature (25° C.) and a low temperature (−35° C.) was counted.

The 90° bending test was carried out on three composite cables 2 of the above specification, the mean value of the number of times of bending until the breakage at room temperature was 49,645 times. In addition, the mean value of the number of times of bending until the breakage at low temperatures was 10,705 times. Therefore, it was confirmed that the composite cable 2 had sufficient bending durability.

(Swinging Endurance Test)

The swinging endurance test was carried out with using the composite cable 2 of the above specification. In the swinging endurance test, one end of the composite cable 2 was fixed and the other end of the composite cable 2 was swung in a vertical direction (upwardly and downwardly) for 2,140,000 times at a normal temperature (25° C.), 430,000 times at a low temperature (−40° C.), and 430,000 times at a high temperature (90° C.), and the electrical resistance at both ends of the first and second wires 3, 4 was measured. As to the distance of swinging, a distance from a neutral point to an upper end was 60 mm and a distance from the neutral point to a lower end was also 60 mm. A single cycle of swinging was an operation of moving from the neutral point to the upper end and the lower end until moving back to the neutral position. A length of the composite cable 2 from the fulcrum (fixed point) to an end (moving point) moving up and down for the above distance was 308 mm.

This test was carried out on the sample Nos. 1 to 4 of the composite cable 2 of the above specification. The mean initial value of the electrical resistance at the first and second wires 3, 4 was 6.91 mΩ/m. When the electric resistance after the swing for the aforementioned number of times was not greater than 10 mΩ/m, the sample was rated as "Pass". TABLE 1 shows the experimental results.

TABLE 1

|  | No. 1 | No. 2 | No. 3 | No. 4 | No. 5 |
|---|---|---|---|---|---|
| Electric resistance of the first wire 3 (mΩ/m) | 7.23 | 7.13 | 7.04 | 7.17 | 7.14 |
| Electric resistance of the second wire 4 (mΩ/m) | 6.98 | 6.96 | 7.08 | 7.12 | 7.04 |

As shown in TABLE 1, the first and second wires 3, 4 in all the samples of Nos. 1 to 5 of the composite cable 2, the electrical resistance after the swinging operation was not greater than 10 mΩ/m, and the evaluation was "Pass". Therefore, it was confirmed that the samples have sufficient swing durability.

The Second Embodiment

Figure 5:
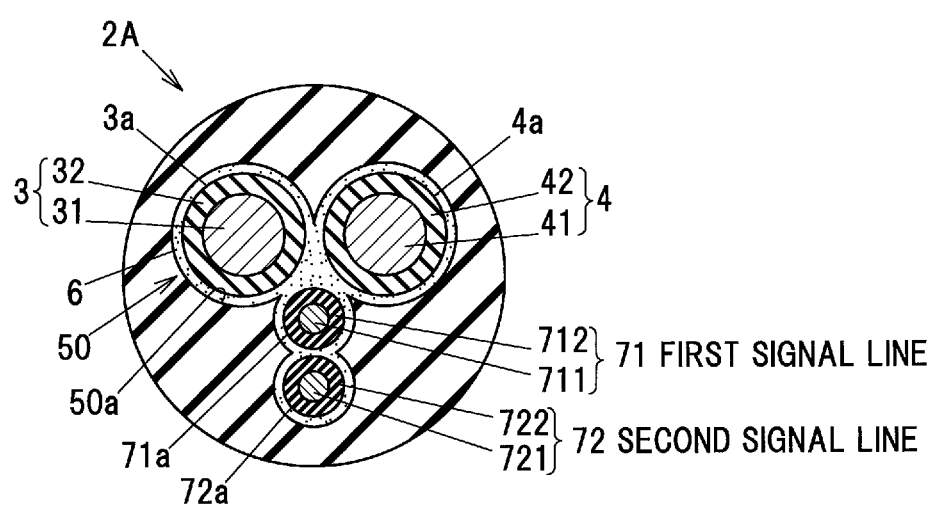
FIG. 5 is a cross-sectional view showing a composite cable in a second embodiment according to the invention.

FIG. 5 is a cross-sectional view of a composite cable 2A in the second embodiment according to the present invention. The composite cable 2A in the second embodiment is different from the composite cable 2 in the first embodiment in that a first signal line 71 and a second signal line 72 as well as the first and second wires 3, 4 are covered by the sheath 5. As to the other elements, the composite cable 2A in the second embodiment has a similar configuration to the composite cable 2 in the first embodiment, so that the elements having similar function and configuration to those of the first embodiment are assigned the same reference numerals and the detailed description thereof are omitted for simplifying the explanation.

The first signal line 71 is an insulated wire which comprises a center conductor 711 and an insulation 712 for coating the center conductor 711 as an electrically insulation coating. The second signal line 72 is an insulated wire which comprises a center conductor 721 and an insulation 722 for coating the center conductor 721 as an electrically insulation coating. A lubricating member 6 is interposed between an outer periphery surface 71a of the first signal line 71 and an outer periphery surface 72a of the second signal line 72 and an inner surface 50a of the inner space 50 of the sheath 5. The lubricating member 6 is also interposed between the outer periphery surface 3a of the first wire 3 and the outer periphery surface 4a of the second wire 4, between the outer periphery surface 71a of the first signal line 71 and the outer periphery surfaces 3a, 4a of the first and second wires 3, 4, and between the outer periphery surface 71a of the first signal line 71 and the outer periphery surface 72a of the second signal line 72.

The first signal line 71 and the second signal line 72 and may be used, for example, for transmitting an output signal of the axial force sensor 15 of the electric brake device 1 to the controller 99. Moreover, it is also possible to transmit an output of a rotation speed sensor (not shown) of the wheel 900 through the first signal line 71 and the second signal line 72.

According to the composite cable 2A in the present embodiment, the effects and advantages similar to those of the composite cable 2 in the first embodiment can be achieved. In addition, since the first signal line 71 and the second signal line 72 are accommodated in the sheath 5 together with the first and second wires 3, 4, it is possible to transmit the output signal of the axial force sensor 15 to the controller 99 while supplying the current to the electromagnetic coil 143a of the parking brake mechanism 14 of the electric brake device 1 by a single composite cable 2A. Further, it is possible to improve the bending durability of the first signal line 71 and the second signal line 72 by virtue of the lubricating member 6.

Figure 6:
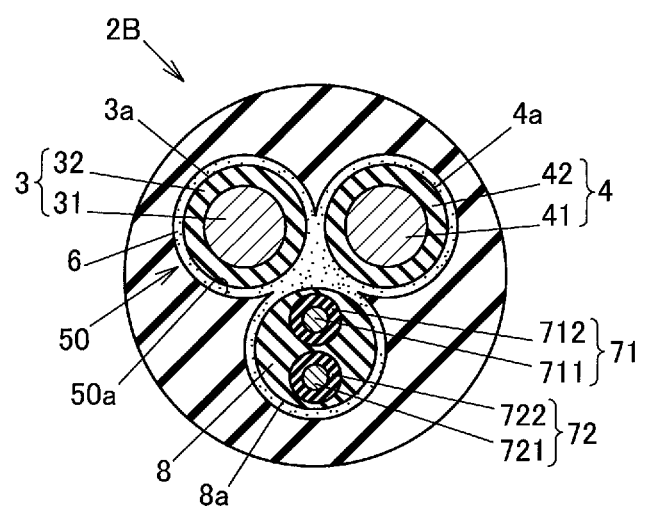
FIG. 6 is a cross-sectional view showing a composite cable in a variation of the second embodiment according to the invention.

According to a composite cable 2B in a modification of the second embodiment as shown in FIG. 6, the first signal line 71 and the second signal line 72 may be collectively covered with an inner jacket 8, to be accommodated in the sheath 5 together with the inner jacket 8. In this case, the bending endurance of the first signal line 71 and the second signal line 72 that are covered by the inner jacket 8 can be improved by the lubricating member 6 interposed between an outer periphery surface 8a of the inner jacket 8 and the inner surface 50a of the inner space 50 of the sheath 5. In addition, the frictional resistance between the inner jacket 8 and the first and the second wires 3, 4 can be reduced by the lubricating member 6 interposed between the outer periphery surface 8a of the inner jacket 8 and the outer periphery surfaces 3a, 4a of the first and second wires 3, 4.

Although the present invention has been described above in relation to the embodiments, the embodiments described above are not intended to limit the invention according to the claims. It should also be noted that all combinations of the features described in the embodiments are not necessarily essential for the means for solving the problems of the present invention.

Further, the present invention may be appropriately modified within a scope of the invention without going beyond the spirit of the invention. For example, in the above embodiments, a case of using the composite cables 2, 2A for operating the parking brake mechanism 14 in the electric brake device 1 has been described, but the present invention is not limited thereto. The composite cables 2, 2A may be used to provide a motor current for the operation of the electric motor 11 of the electric brake device 1.

In the above embodiments, the invention has been described in relation to the example where the parking brake mechanism 14 of the electric brake device 1 is mainly configured to regulate the rotation of the shaft 110 of the electric motor 11 for braking the vehicle during travelling, thereby maintaining the braking force during parking. The present invention is, however, not limited to the above example. The composite cable 2 may be connected to an electric brake device specially configured for the parking brake provided in addition to a hydraulic braking device for braking during travelling.

In addition, the number of child strands 30, 40 in the first and second wires 3, 4, the number of solid conductors 300, 400, and the outer diameters of the first and second wires 3, 4, and the like may be determined appropriately according to the required current capacity.

Summary of the Embodiments

Next, technical ideas grasped from the embodiments described above will be described with reference numerals used in the explanation of the embodiment. However, the reference numerals in the following description do not limit the components in the appended claims to the members or the like concretely shown in the embodiments.

[1] A composite cable (2, 2A) for a vehicle, configured to connect between a wheel-side device (1) which is fixed on a wheel (900) side via a suspension device (90) with respect to a body (9) of the vehicle and a body-side device (99) disposed on a body (9) side, the composite cable (2, 2A) comprising:
 wires (3, 4), each of which comprises a center conductor (31, 41) and an insulation (32, 42) for coating the center conductor (31, 41), the center conductor (31, 41) comprising a stranded wire comprising a plurality of solid conductors stranded with each other, a diameter of each solid conductor being 0.05 mm to 0.12 mm;
 a sheath (5) collectively covering the wires (3, 4); and
 a lubricating member (6) interposed between the wires (3, 4) and the sheath (5) for reducing a frictional resistance between the wires (3, 4) and the sheath (5).

[2] The composite cable (2, 2A) for a vehicle according to [1], wherein the center conductor (31, 41) is a double stranded wire formed by combining and stranding a plurality of child strands (30, 40), each of which comprises the plurality of solid conductors (300, 400) stranded with each other and the plurality of child strands (30, 40) are stranded in a same stranding direction as a stranding direction of the solid conductors (300, 400) in the plurality of child strands (30, 40).

[3] The composite cable (2, 2A) for a vehicle according to [1] or [2], wherein the lubricating member (6) is consisted essentially of powder having a particle size of 5 μm to 50 μm.

[4] The composite cable (2, 2A) for a vehicle according to any one of [1] to [3], wherein the wires (3,4) are twisted with each other.

[5] The composite cable (2, 2A) for a vehicle according to any one of [1] to [3], wherein the lubricating member (6) is interposed between the wires (3, 4).

[6] The composite cable (2, 2A) for a vehicle according to any one of [1] to [5], wherein JISA hardness of the sheath (5) is from 80 degrees to 95 degrees.

[7] The composite cable (2, 2A) for a vehicle according to any one of [1] to [6], wherein the diameter of each solid conductor is 0.07 mm to 0.09 mm.

What is claimed is:

1. A composite cable for a vehicle, configured to connect between a wheel-side device which is fixed on a wheel side and a body-side device disposed on a body side, the composite cable comprising:
 two wires, each of which comprises a center conductor and an insulation for coating the center conductor;
 a sheath collectively covering the two wires, and
 a lubricating member consisting essentially of powder having a particle size of 5 μm to 50 μm interposed between the two wires and the sheath for reducing a frictional resistance between the two wires and the sheath,
 wherein the center conductor comprises 7 to 19 pieces of child strands, each of the child strands comprises 50 to 100 pieces of solid conductors stranded with each other,
 wherein a diameter of each solid conductor is 0.05 mm to 0.12 mm, wherein the child strands are stranded in a same stranding direction as a stranding direction of the solid conductors in the child strands in the center conductor, and
 wherein twisting directions of the two wires are opposite to the stranding directions of the solid conductors in the child strands and the stranding directions of the child strands in the center conductor.

2. The composite cable for a vehicle according to claim 1, wherein the lubricating member is interposed between the two wires.

3. The composite cable for a vehicle according to claim 1, wherein JISA hardness of the sheath is from 80 degrees to 95 degrees.

4. The composite cable for a vehicle according to claim 1, wherein the diameter of each solid conductor is 0.07 mm to 0.09 mm.

5. The composite cable for a vehicle according to claim 2, wherein JISA hardness of the sheath is from 80 degrees to 95 degrees.

6. The composite cable for a vehicle according to claim 2, wherein the diameter of each solid conductor is 0.07 mm to 0.09 mm.

7. A composite cable for a vehicle, configured to connect between a wheel-side device which is fixed on a wheel side and a body-side device disposed on a body side, the composite cable comprising:
 two wires, each of which comprises a center conductor and an insulation for coating the center conductor; and
 a sheath collectively covering the two wires,
 wherein the center conductor comprises 7 to 19 pieces of child strands, each of the child strands comprises 50 to 100 pieces of solid conductors stranded with each other,
 wherein a diameter of each solid conductor is 0.05 mm to 0.12 mm, wherein the child strands are stranded in a same stranding direction as a stranding direction of the solid conductors in the child strands in the center conductor,
 wherein twisting directions of the two wires are opposite to the stranding directions of the solid conductors in the child strands and the stranding directions of the child strands in the center conductor, and
 wherein JISA hardness of the sheath is from 80 degrees to 95 degrees.

8. The composite cable for a vehicle according to claim 7, wherein the diameter of each solid conductor is 0.07 mm to 0.09 mm.

9. The composite cable for a vehicle according to claim 7, further comprising a lubricating member interposed between the two wires and the sheath for reducing a frictional resistance between the two wires and the sheath.

10. The composite cable for a vehicle according to claim 9, wherein the lubricating member consists essentially of powder having a particle size of 5 μm to 50 μm.

11. The composite cable for a vehicle according to claim 9, wherein the lubricating member is interposed between the two wires.

12. The composite cable for a vehicle according to claim 7, further comprising a lubricating member interposed between the two wires and the sheath for reducing a frictional resistance between the two wires and the sheath.

13. The composite cable for a vehicle according to claim 12, wherein the lubricating member consists essentially of powder having a particle size of 5 μm to 50 μm.

14. The composite cable for a vehicle according to claim 12, wherein the lubricating member is interposed between the two wires.

15. A composite cable for a vehicle, configured to connect between a wheel-side device which is fixed on a wheel side and a body-side device disposed on a body side, the composite cable comprising:
- two wires, each of which comprises a center conductor and an insulation for coating the center conductor; and
- a sheath collectively covering the two wires,
- wherein the center conductor comprises 7 to 19 pieces of child strands, each of the child strands comprises 50 to 100 pieces of solid conductors stranded with each other,
- wherein a diameter of each solid conductor is 0.05 mm to 0.12 mm, wherein the child strands are stranded in a same stranding direction as a stranding direction of the solid conductors in the child strands in the center conductor,
- wherein twisting directions of the two wires are opposite to the stranding directions of the solid conductors in the child strands and the stranding directions of the child strands in the center conductor, and
- wherein an electric resistance measured between both ends of the two wires is not greater than 10 mΩ/m after one end of the composite cable is fixed and the other end of the composite cable is swung in a vertical direction for 2,140,000 times at a temperature of 25° C., 430,000 times at a temperature of −40° C., and 430,000 times at a temperature of 90° C.

16. The composite cable for a vehicle according to claim 15, further comprising a lubricating member interposed between the two wires and the sheath for reducing a frictional resistance between the two wires and the sheath.

17. The composite cable for a vehicle according to claim 16, wherein the lubricating member consists essentially of powder having a particle size of 5 μm to 50 μm.

18. The composite cable for a vehicle according to claim 16, wherein the lubricating member is interposed between the two wires.

19. The composite cable for a vehicle according to claim 15, wherein JISA hardness of the sheath is from 80 degrees to 95 degrees.

20. The composite cable for a vehicle according to claim 15, wherein the diameter of each solid conductor is 0.07 mm to 0.09 mm.

* * * * *